(12) United States Patent
Braun et al.

(10) Patent No.: US 8,193,460 B2
(45) Date of Patent: Jun. 5, 2012

(54) STEERING WHEEL HORN SWITCH (75) Inventors: William P. Braun, Bruce, MI (US);
Thomas J. Klena, II, Bruce, MI (US);
Joseph J. Zwolinski, Sterling Heights, MI (US); Gabriel Anaya, El Paso, TX (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 235 days.

(21) Appl. No.: 12/767,001

(22) Filed: Apr. 26, 2010

(65) Prior Publication Data

US 2011/0259141 A1    Oct. 27, 2011

(51) Int. Cl.
*H01H 9/00* (2006.01)
(52) U.S. Cl. .................................................. 200/61.54
(58) Field of Classification Search ............... 200/61.54, 200/61.55, 5 R, 16 B, 61.57, 329, 341; 74/552
See application file for complete search history.

(56) References Cited

U.S. PATENT DOCUMENTS

| | | | | | |
|---|---|---|---|---|---|
| 1,997,780 | A | * | 4/1935 | Newton | 200/61.27 |
| 2,131,649 | A | * | 9/1938 | Turnage | 74/484 R |
| 2,224,457 | A | * | 12/1940 | Kobiella | 200/61.38 |

* cited by examiner

*Primary Examiner* — Edwin A. Leon
(74) *Attorney, Agent, or Firm* — Tarolli, Sundheim, Covell & Tummino LLP (57) ABSTRACT

A horn switch (40) for a vehicle steering wheel (20) includes a frame (50) for mounting to the steering wheel (20). The frame (50) includes a horn switch housing (56). A plunger (80) is associated with the switch housing (56). The plunger (80) is movable relative to the switch housing (56) between a non-actuating position and an actuating position. An actuatable cable (150) has a portion positioned in the switch housing (56). The actuating cable (150) includes first and second conductors (156, 158) for electrical connection to a circuit that when closed actuates a vehicle horn (30). The actuatable cable (150) has an expanded condition in which the first and second conductors (156, 158) are insulated from each other when the plunger (80) is in the non-actuating position. The plunger (80) when in the actuating position acting on the cable (150) to place the cable (150) in a compressed condition in which electrical continuity is established between the first and second conductors (156, 158) to close the circuit and actuate the vehicle horn (30).

27 Claims, 5 Drawing Sheets

STEERING WHEEL HORN SWITCH

TECHNICAL FIELD

The present invention relates to steering wheels and, in particular, relates to an actuatable cable horn switch for a steering wheel.

BACKGROUND OF THE INVENTION

Vehicle steering wheels typically include an airbag module and one or more horn switches. Therefore, it may be desirable to design horn switches that are less expensive and less sensitive to dust, dirt, and other contaminants.

SUMMARY OF THE INVENTION

The present invention relates to a horn switch for a vehicle steering wheel that includes a frame for mounting to the steering wheel. The frame includes a horn switch housing. A plunger is associated with the switch housing. The plunger is movable relative to the switch housing between a non-actuating position and an actuating position. An actuatable cable has a portion positioned in the switch housing. The actuatable cable includes first and second conductors for electrical connection to a circuit that when closed actuates the vehicle horn. The actuatable cable has an expanded condition in which the first and second conductors are insulated from each other when the plunger is in the non-actuating position. The plunger when in the actuating position acting on the actuatable cable to place the cable in a compressed condition in which electrical continuity is established between the first and second conductors to close the circuit and actuate the vehicle horn.

The present invention further relates to a horn switch for a vehicle steering wheel that includes a frame for mounting to the steering wheel. The frame includes a plurality of switch housings. A plunger is associated with each switch housing and is movable relative to it associated switch housing between a non-actuating position and an actuating position. An actuatable cable for providing an electrical signal to a vehicle horn has a portion positioned within each switch housing. The actuatable cable includes a first conductor, a second conductor, and a deformable layer positioned between the first conductor and the second conductor. The actuatable cable has (a) an expanded condition in which the deformable layer prevents electrical signals from passing between the first conductor and the second conductor when the plunger is in the non-actuating position and (b) a compressed condition in which electrical signals pass between the first conductor and the second conductor when the plunger is in the actuating position.

The present invention further relates to a vehicle steering wheel that includes a hub, a rim, and at least one spoke interconnecting the hub and the rim. The steering wheel further includes a horn switch that includes a frame mounted to the steering wheel. The frame includes a plurality of switch housings. A plunger is associated with each switch housing and is movable relative to it associated switch housing between a non-actuating position and an actuating position. An actuatable cable for providing an electrical signal to a vehicle horn has a portion positioned within each switch housing. The actuatable cable includes a first conductor, a second conductor, and a deformable layer positioned between the first conductor and the second conductor. The actuatable cable has (a) an expanded condition in which the deformable layer prevents electrical signals from passing between the first conductor and the second conductor when the plunger is in the non-actuating position and (b) a compressed condition in which electrical signals pass between the first conductor and the second conductor when the plunger is in the actuating position.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
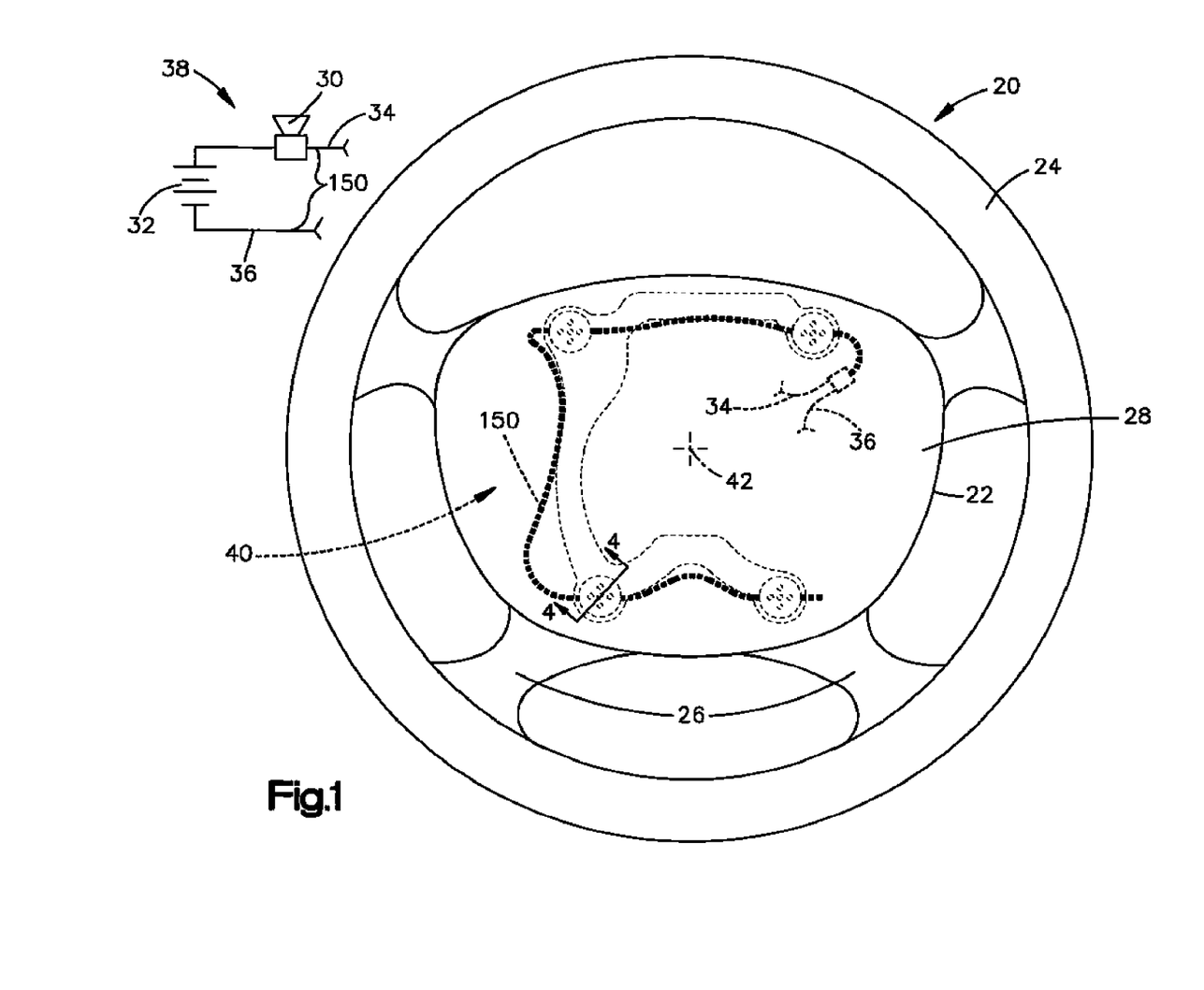
FIG. 1 is a plan view that illustrates schematically a vehicle steering wheel according to an embodiment of the present invention.
Figure 2:
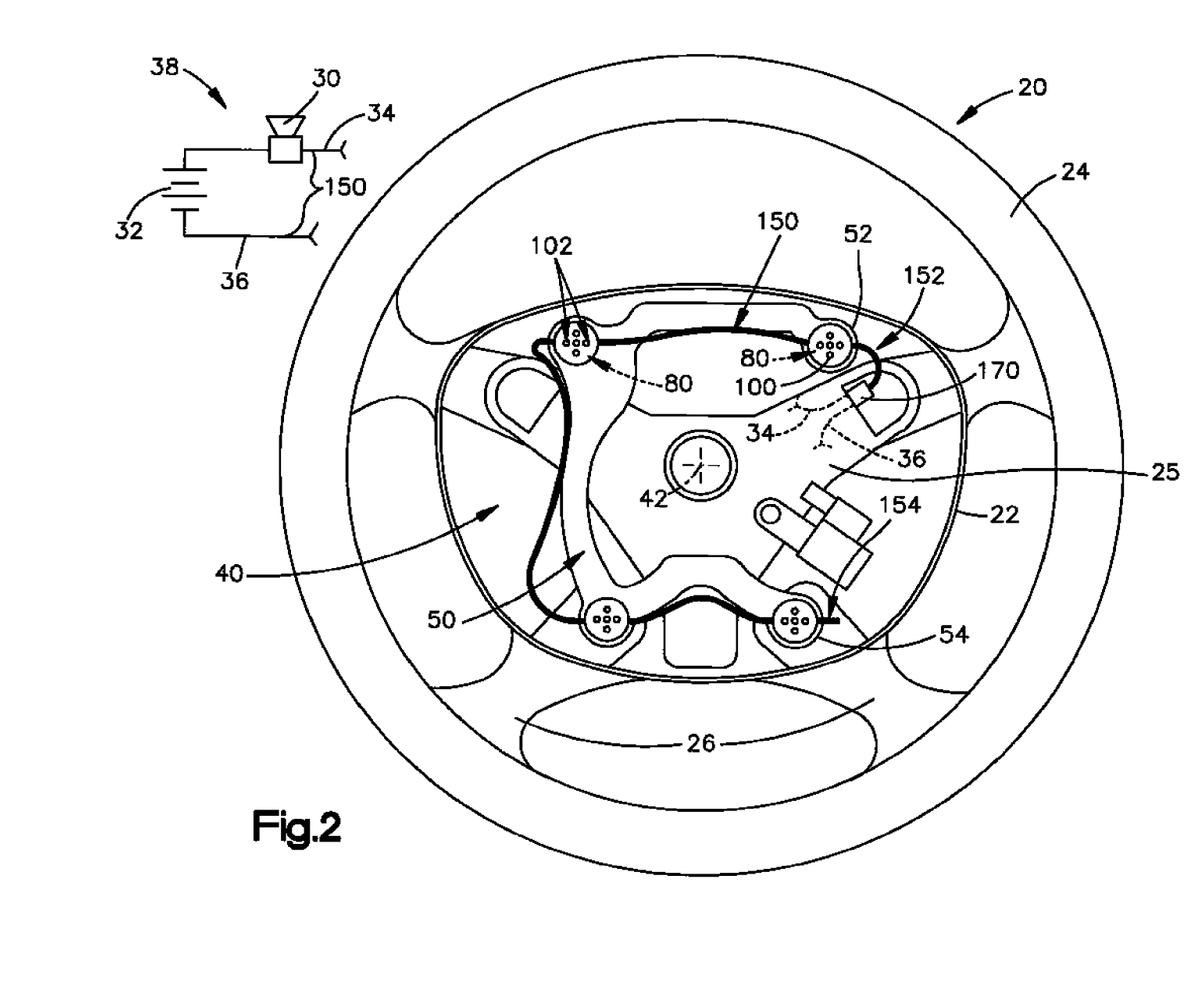
FIG. 2 is a plan view of the steering wheel of FIG. 1 with portions removed for clarity.

The present invention relates to steering wheels and, in particular, to an actuatable cable horn switch for a steering wheel. FIGS. 1 and 2 illustrate a vehicle steering wheel 20 that has a horn switch 40 for actuating a horn 30 of a vehicle in accordance with the present invention. The steering wheel 20 includes a hub 22, a rim 24, and a plurality of spokes 26 that interconnect the hub and the rim. The steering wheel 20 also includes an armature 25 that provides a skeleton or frame for the steering wheel. The armature 25, which may be made of metal, extends through the hub 22, the rim 24, and the spokes 26 and may be covered with a foamed plastic material. The hub 22 of the steering wheel 20 receives an air bag module (not shown) or, optionally, a horn pad or plate (not shown).

A cover 28 overlies the hub 22 and the air bag module and/or horn pad. The cover 28 is movable relative to the hub generally along an axis 42 that extends substantially perpendicular to the steering wheel 20. The cover 28 may be attached to, and installed in the steering wheel 20 as part of the air bag module (not shown) and/or horn pad (not shown) or may be separately joined to the steering wheel. Any suitable material, such as plastic or leather, may be used to form the cover 28.

The horn switch 40 is electrically connected with the horn 30 and with a power supply 32 of the vehicle, such as a battery. The horn 30 and the power supply 32 are part of an electrical circuit 38 that also includes the horn switch 40 and wires 34 and 36 that electrically connect the horn switch to the power supply and the horn. When the horn switch 40 is open, the circuit 38 is open, and the horn 30 remains unactuated. When the horn switch 40 is closed, the circuit 38 is closed, and electrical power is delivered to the horn 30 from the power supply 32 to actuate the horn.

Figure 3:
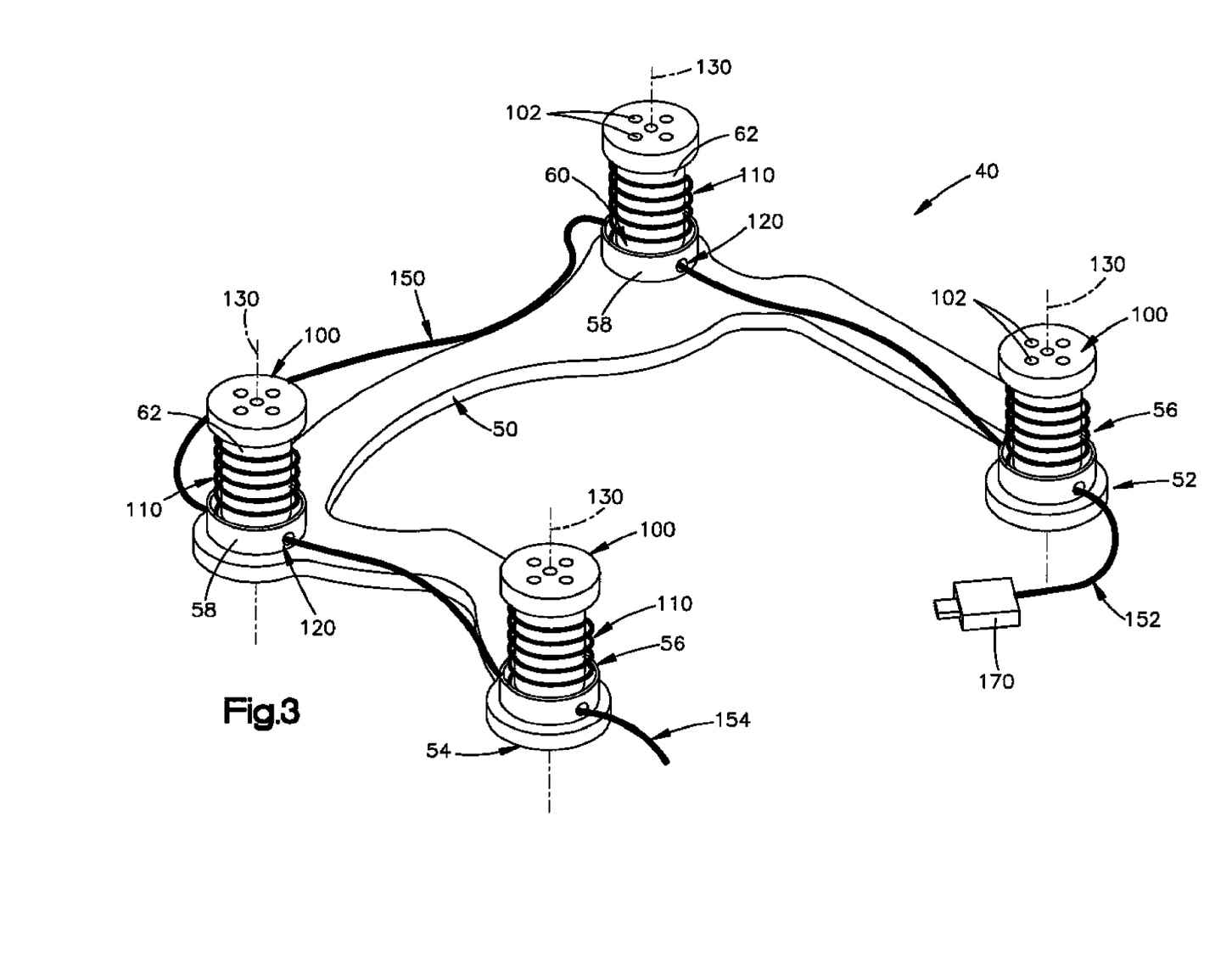
FIG. 3 is an enlarged perspective view of a vehicle horn switch of the steering wheel of FIG. 1.

Referring to FIGS. 2-3, the horn switch 40 includes a frame 50 that secures the horn switch to the armature 25 of the steering wheel 20. The frame 50 has a generally C-shaped construction and includes a first end 52 and an opposite second end 54. The frame 50 is shaped and contoured to comply with the configuration of the steering wheel 20 and the armature 25. The frame 50 is constructed of a rigid material such as metal, plastic or a combination thereof. Although the frame 50 is illustrated as being located substantially in the hub 22 of the steering wheel 20, those having ordinary skill will appreciate that portions of the frame may alternatively or additionally be located substantially on or along one or more of the steering wheel spokes 26.

Figure 4:
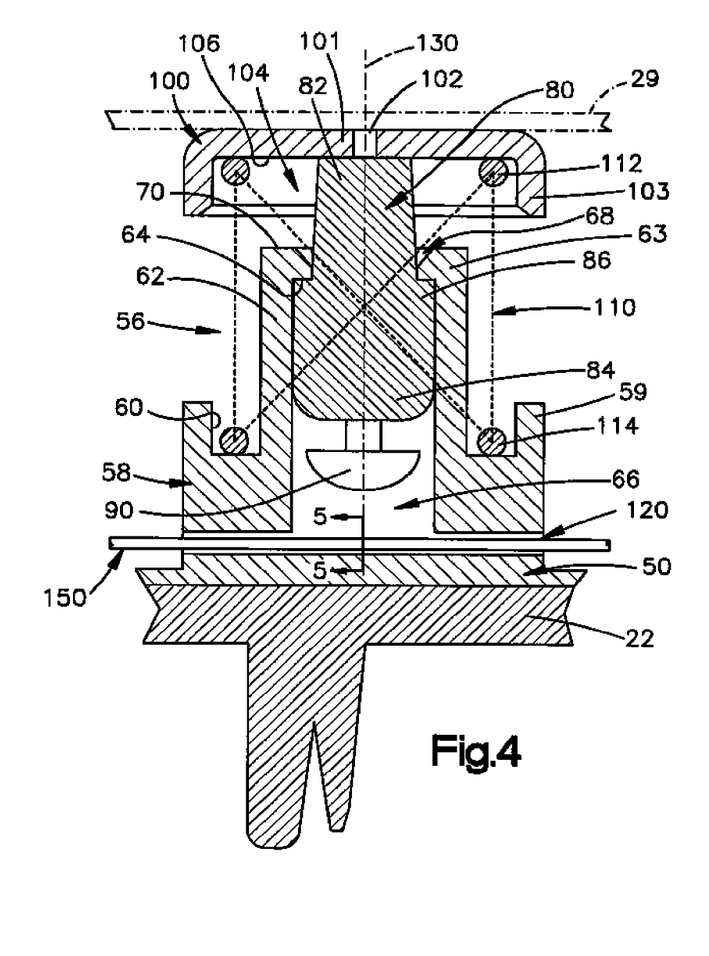
FIG. 4 is a section view, taken generally along line 4-4 of FIG. 1, illustrating the horn switch in a non-actuating position.

FIGS. 3 and 4 illustrate the horn switch 40 in greater detail. At least one switch housing 56 extends transversely from and may be formed in one piece with the frame 50. Although four switch housings 56 are illustrated, those skilled in the art will appreciate that the present invention may include more or fewer switch housings. Each switch housing 56 has a generally cylindrical construction and includes a base portion 58 and a cylindrical sleeve portion 62 that extends from the base portion. The sleeve portion 62 has a diameter that is smaller than the diameter of the base portion 58, which gives the switch housing 56 a generally stepped construction. An annular rim 59 (FIG. 4) projects from the base portion 58 and helps define an annular recess 60 that encircles the sleeve portion 62. A lateral passage 120 extends entirely through the base portion 58 transverse to the sleeve portion 62.

Each switch housing 56 includes a cylindrical central passage 66 that extends lengthwise of the switch housing through both the base portion 58 and the sleeve portion 62. At one end, the central passage 66 is closed by an end wall 63 of the sleeve portion 62. The end wall 63, which is located at the end of the sleeve portion 62 opposite the base portion 58, includes an opening 68. The opening 68 passes through the end wall 63 and communicates with the cylindrical central passage 66 defined by the sleeve portion 62 and the base portion 58. The central passage 66 has a diameter that is greater than the diameter of the opening 68. The end wall 63 of the sleeve portion 62 includes a retaining surface 64 positioned longitudinally between the opening 68 and the central passage 66.

The horn switch 40 further includes a plunger 80 positioned within the central passage 66 of each switch housing 56. Each plunger 80 includes a first portion 82, a second portion 84, and a stop portion 86 interconnecting the first portion and the second portion. An actuator 90 for actuating the vehicle horn 30 is secured to and extends away from the second portion 84 of the plunger 80. The first portion 82 of the plunger 80 has a first diameter, and the second portion 84 has a second diameter greater than the first diameter which gives the plunger a generally stepped construction. The plunger 80 is sized such that the first portion 82 is capable of extending through the opening 68 in the end wall 63 of the switch housing 56, while the second portion 84 of the plunger is incapable of extending through the opening. The plunger 80 is movable within the passage 66 along a switch axis 130 that extends substantially parallel to the axis 42.

A cap 100 is secured to the first portion 82 of each plunger 80 (FIG. 4). Each cap 100 has a generally flattened, cylindrical configuration with a circular top wall 101 and a downward extending annular side wall 103 that defines a downward facing recess 104. A plurality of openings 102 are arranged in a predetermined pattern on, and extend through, the top wall 101.

Figure 5:
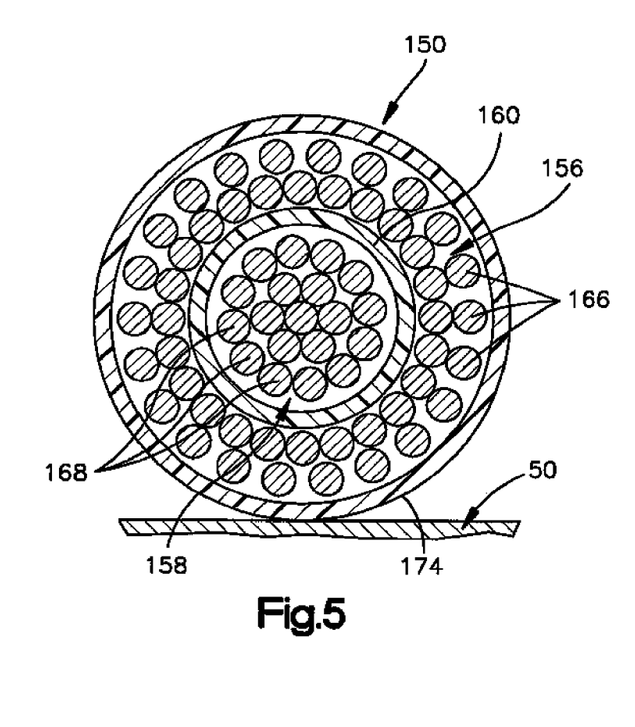
FIG. 5 is a section view, taken generally along line 5-5 of FIG. 4, illustrating a actuatable cable of the horn switch in a non-actuated condition.

The horn switch 40 further includes a flexible actuatable cable 150 that is electrically connected to the vehicle horn 30. The construction of the actuatable cable 150 is illustrated in FIG. 5. The actuatable cable 150 includes a first conductor 156, a second conductor 158, and a deformable layer 160 separating the first conductor and the second conductor. The second conductor 158 is encircled by the deformable layer 160, and the first conductor 156 encircles the deformable layer. The first conductor 156, the second conductor 158, and the deformable layer 160 are thus substantially co-axial. The first conductor 156 is covered, coated or otherwise encircled by a non-conductive outer layer 174 that protects and seals the actuatable cable 150 from dust, dirt, water, moisture and/or other contaminants.

The first conductor 156 may include one or more conductive first wire filaments 166, and the second conductor 158 may include one or more conductive second wire filaments 168. In particular, the first and second conductors 156 and 158 may be made of copper wire filaments, but other metals and alloys known in the art may be used so long as the first and second conductors conduct electricity. The first conductor 156, the second conductor 158, or both the first and second conductors may also constitute single wire filament or multiple braids of conductive material.

The deformable layer 160 may include any structure or material that physically separates the first conductor 156 from the second conductor 158, while also insulating the conductors from each other. In addition to support and insulation, the deformable layer 160 should deform under pressure, such that at a predetermined amount of deformation, electrical signals pass between the first conductor 156 and the second conductor 158. For example, the deformable layer 160 may be constructed so that when it deforms the first and second conductors 156 and 158 touch to close the electrical circuit. In the alternative, the first and second conductors 156 and 158 need not touch to close the electrical circuit. Rather, the material of the deformable layer 160 may be such that its insulating properties change as it deforms.

In one embodiment, the deformable layer 160 may include a foamed material that separates the first and second conductors 156 and 158 and provides insulation. The application of pressure causes the foam to deform to a point where electrical current can pass through the deformable layer 160 between the first conductor 156 and the second conductor 158. One foam useful as a deformable layer 160 is a thermoplastic foam such as low density polyethylene. The foam may be made up of between 10-90% by volume of void spaces, although alternative constructions and materials that provide the characteristics permitting current flow between the first and second conductors 156 and 158 in response to pressure may be used.

Alternatively, the deformable layer 160 may include a plurality of struts that hold the first and second conductors 156 and 158 apart in the absence of any pressure. The air contained in the spaces between the struts of the deformable layer 160 thereby acts as insulation. The application of pressure upon the deformable layer 160 causes the struts to deform sufficiently to reduce the air space thereby reducing the resistance, eventually to a point where electrical signals pass between the first and second conductors 156 and 158. When the actuatable cable 150 has a coaxial construction, the struts of the deformable layer 160 may radiate from the second conductor 158 to support the first conductor 156.

The deformable layer 160 may include any material that acts as a partial conductor or a resistor. This may include, for example, organic semi-conductive materials or inorganic materials. In particular, the deformable layer 160 may include a base material doped with filler. The base material may be selected from thermoplastics such as polyolefins, polyethylenes and polypropylenes, styrenes, polyvinylchlorides, polyamides, polyesters, polyimides, and fluoropolymers.

Alternatively, the deformable layer 160 may be a thermoplastic resin, a thermosetting resin or a silicone, any of which may be doped (i.e., filler added) or used neat (i.e., no filler added).

The filler may be any material that affects, i.e., increase or decreases, the resistance of the base material through its addition to the base material. In one example, the filler is a powder or particulate material, which is blended with the base material, although liquids may also be used. The filler may be resistive, conductive or semi-conductive. The filler may be a single material or multiple materials selected to achieve desired resistive properties. One example of conductive filler is carbon, such as carbon black or lamp black carbon. Metals, such as gold and silver, may also be used as conductive fillers. The amount of filler is typically between 0.01 and 75 weight percent of the deformable layer 160. Nonetheless, any percentage can be used to achieve a desired resistance of the semi-conductive layer.

Regardless of the particular construction of the deformable layer 160, when the actuatable cable 150 is in the expanded condition, the electrical circuit between the first and second conductors 156 and 158 is incomplete. When any portion of the actuatable cable 150 is compressed beyond a predetermined amount, the circuit is completed and electrical signals, e.g., current, pass from the first conductor 156 to the second conductor 158. Those skilled in the art will appreciate that the electrical signals could likewise flow from the second conductor 158 to the first conductor 156 when the actuatable cable 150 is compressed. In either case, when the compressive force is removed from the actuatable cable 150 or the actuatable cable has returned to the expanded condition, the electrical circuit between the first and second conductors 156 and 158 is broken and current flow between the first and second conductors is prevented.

The non-conductive layer 174 may be formed using any material that serves to protect the actuatable cable 150 from abrasion and cut-through. The materials used to form the non-conductive layer 174 may also be selected to provide crush resistance or thermal insulation properties. For example, the non-conductive layer 174 may be formed using materials such as polyolefins, polyethylenes and polypropylenes, styrenes, polyvinylchlorides, polyamides, polyesters, polyimides, and fluoropolymers. The non-conductive layer 174 may also be formed using thermosetting materials or silicones. The material(s) used to form the non-conductive layer 174 may be doped or used neat.

As shown in FIGS. 2-3, the actuatable cable 150 includes a first end 152 and a second end 154 and extends along the frame 50 through the lateral opening 120 of each switch housing 56 between the first end 52 of the frame and the second end 54 of the frame. The flexible construction of the actuatable cable 150 allows the cable to be routed along any path in the steering wheel 20 in order to accommodate any placement or configuration of the switch housings 56 throughout the steering wheel. Since the actuatable cable 150 is routed through the central passage 66 of each switch housing 56 on the frame 50, and the plungers 80 are movably positioned within each central passage, the central passages enable direct interaction between the plungers and the actuatable cable.

As shown in FIG. 4, the plungers 80 are movably positioned within the central passages 66 such that the stop portion 86 of each plunger cooperates with the retaining surface 64 of the associated switch housing 56 to limit axial movement of the plunger in a first direction within the central passage along the switch axis 130 (i.e., upward, as viewed in FIG. 4). In particular, during axial movement of the plunger 80 in the first direction relative to the switch housing 56, the stop portion 86 engages the retaining surface 64 to prevent the second portion 84 of the plunger from exiting the central passage 66 of the switch housing. The actuator 90 secured to the second end 84 of the plunger 80 limits axial movement of the plunger 80 in a second direction (i.e., downward, as viewed in FIG. 4) opposite the first direction along the switch axis 130.

After the plungers 80 are positioned within the central passages 66 of the switch housings 56, the openings 102 in the caps 100 may receive fasteners (not shown) to secure the caps to the plungers and to movable structure 29. The structure 29 may constitute, for example, an airbag module housing, frame, or other airbag module component. Alternatively, the structure 29 may constitute a horn pad (not shown) or a portion of the cover 28. The fasteners may interconnect the structure 29, the caps 100, and the plungers 80. The caps 100 collectively support the structure 29 for movement relative to the hub 22.

The recess 104 of each cap 100 receives a coiled compression spring 110 to bias the cap and, thus, the plunger 80 and the structure 29 away from the frame 50. The spring 110 includes a first end 112 that is received in the recess 104 of the cap 80 and a second end 114 that is received in the recess 60 of the base portion 58 of the switch housing 56. In this configuration, the spring 110 encircles the sleeve portion 62 of the switch housing 56 and the plunger 80 about the switch axis 130. By positioning the spring 110 around the sleeve portion 62 of the switch housing 56 and in the recess 104 of the cap 100 and the recess 60 of the base portion 58 of the switch housing, the spring is restricted from moving transversely relative to the switch axis 130 during operation of the horn switch 40. In an initial state, the plunger 80 is biased to a non-actuating position relative to the frame 50, as shown in FIG. 4. When the plunger 80 is in the non-actuating position, the actuator 90 secured to the plunger is in a position that is longitudinally spaced from the actuatable cable 150.

Figure 6:
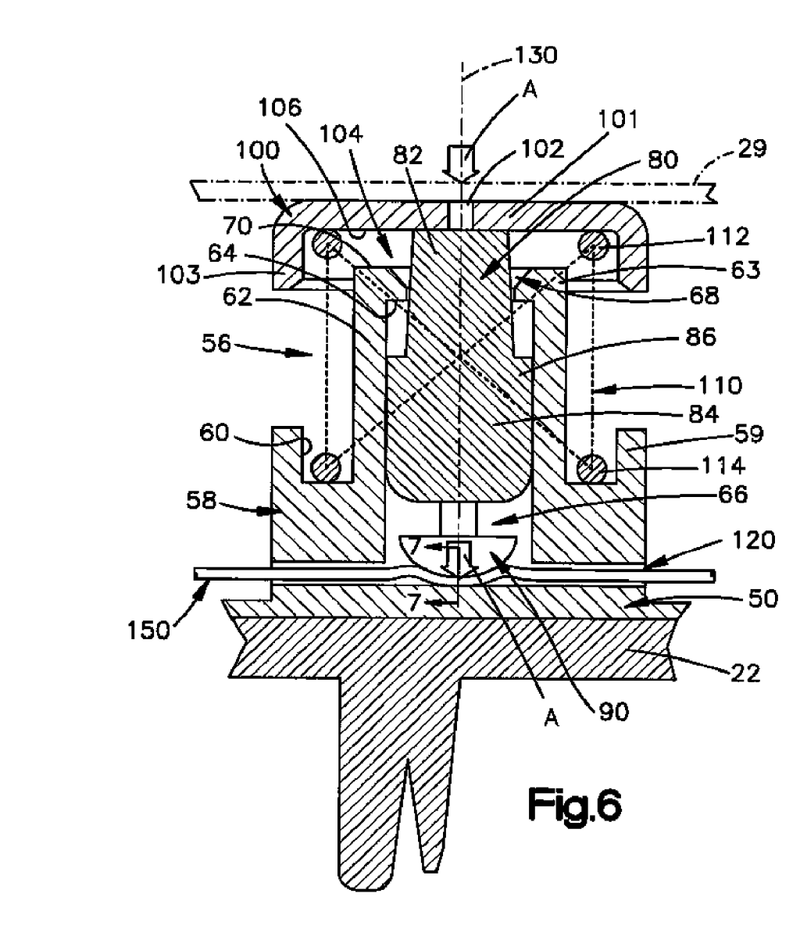
FIG. 6 is a section view of the horn switch in FIG. 4 in an actuating position.

The construction of the structure 29 and the location of the downward force upon the structure determine the number of plungers 80 that are moved to an actuating position, shown in FIG. 6. For example, a structure 29 that has a more rigid construction will move relative to the hub 22 in a more unitary manner, thereby causing more plungers 80 to move towards the actuating position. On the other hand, a structure 29 that has a more flexible construction will tend to have a more localized force distribution adjacent the applied downward force and, thus, will cause fewer plungers to move to the actuating position. Additionally, the application of force to the center of the structure 29 will tend to cause more plungers 80 to move to the actuating position than a force applied nearer the periphery of the structure. In any case, the depression of the structure 29 towards the hub 22 will cause one or more plungers 80 to move to the actuating position to actuate the vehicle horn 32. Since only a portion of the actuatable cable 150 needs to be sufficiently compressed in order to close the electrical circuit 38 and thereby actuate the vehicle horn 30, the use of multiple plungers dispersed throughout the hub 22 or the spokes 24 or the hub and spokes of the steering wheel 20 produces a reliable and repeatable horn switch 40.

When the plunger 80 is in the non-actuated position, the actuatable cable 150 is not compressed by the actuator 90 and, thus, has an expanded condition. Since the actuatable cable 150 does not conduct electricity in an expanded condition, the electrical circuit 38 between the power supply 32, the vehicle horn 30, and the actuatable cable is not complete and the horn is not actuated when the plunger is in the non-actuated position. When it becomes desirable to actuate the vehicle horn 30, the vehicle operator applies a downward force to the structure 29, which urges the structure towards the hub 22 of the steering wheel 20 in a direction indicated generally by the arrow labeled "A" in FIG. 6. The downward force on the structure 29 towards the hub 22 acts in opposition to the biasing force of the springs 110. When the downward force on the structure 29 exceeds a predetermined amount, the biasing force of the springs 110 is overcome and the structure begins to move towards the hub 22 in the direction A.

Figure 7:
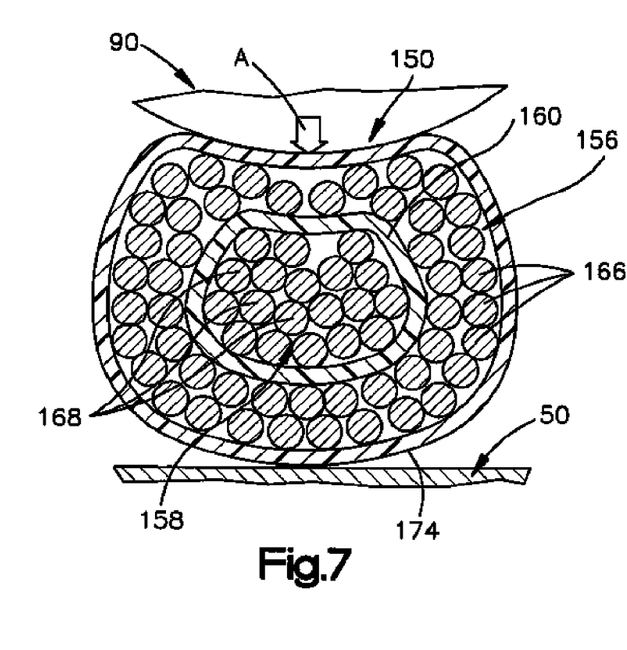
FIG. 7 is a section view, taken generally along line 7-7 of FIG. 6, illustrating the actuatable cable in an actuated condition.

Movement of the structure 29 in this manner causes at least one plunger and, thus, the actuator 90 on the plunger to move downward through the central passage 66 and along the switch axis 130 towards the frame 50. The actuator 90 on the plunger 80 moves toward the portion of the actuatable cable 150 within the central passage 66 until the actuator engages the actuatable cable. Further movement of the actuator 90 along the switch axis 130 and towards the frame 50 deforms the actuatable cable 150 and, thus, the deformable layer 160 as shown in FIG. 7. The actuator 90 has a rounded or other construction to prevent damage to the actuatable cable 150 as the actuator compresses the actuatable cable. When the deformable layer 160 has been compressed and deformed a predetermined amount by the actuator 90, the deformable layer will begin to conduct electricity to allow current flow through the actuatable cable 150.

In other words, as the structure 29 is moved downward in the direction A, at least one of the plungers 80 connected to the structure will move along the switch axis 130 towards the frame 50 and compress the actuatable cable 150 until the plunger reaches an actuated position in which current flows through the actuatable cable. When the plunger 80 reaches the actuated position, the electrical circuit 38 between the power supply 32, the vehicle horn 30, and the actuatable cable 150 is completed, thereby allowing current to flow through the actuatable cable to actuate the vehicle horn. Due to the construction of the actuatable cable 150, movement of a single plunger 80 to the actuating position is sufficient to complete the electrical circuit 38 and actuate the vehicle horn 30. If the operator of the vehicle subsequently releases the downward force on the structure 29 or otherwise causes the downward force to fall below the predetermined amount, current flow through the actuatable cable 150 will cease, thereby opening the electrical circuit 38 and deactivating the horn 32.

Due to flexibility in the construction of the frame 50 and switch housings 56 of the horn switch 40, the horn switch can be designed to accommodate any steering wheel 20 geometry. In particular, the size, location, and number of plungers 80 used to actuate the vehicle horn 32 can be configured to ensure horn actuation regardless of which portion of the cover 28 is depressed.

Furthermore, the caps 100 and the switch housings 56 may be configured to limit the amount of downward movement of the plungers 80 towards the frame 50 in order to ensure that the actuator 90 does not over compress or otherwise damage the actuatable cable 150. In particular, a top surface 70 of end wall 63 of the switch housing 56 and an inner surface 106 defining the recess 104 of the cap 100 may be spaced from one another such that the top surface and the inner surface engage one another and prevent further downward movement of the plunger 80 towards the frame before the actuatable cable 150 becomes over compressed by the actuator 90 while still allowing current flow through the actuatable cable. In other words, the cap 100 will bottom out on the top surface 70 of the end wall 63 of the switch housing 56 before the actuator 90 damages the actuatable cable 150.

The horn switch of the present invention is advantageous in that, unlike conventional horn switches, there is no need for switch contacts and wire connections in each of the switch housings. The intricate and time consuming soldering and/or crimping of connections at each contact point of conventional horn switches can add assembly time and cost.

The assembly of the present invention is also advantageous over conventional horn switches due to its simplicity and reduction in parts. In particular, the present invention only requires feeding the actuatable cable through the lateral passage in each switch housing, whereas conventional horn switches require the aforementioned time consuming soldering and/or crimping of electrical contacts. The simplicity of installation of the horn switch of the present invention not only reduces the number of parts required for assembly, but the size of the horn switch may also be reduced since the switch housing does not have to house as many parts as conventional horn switches. By reducing the size of the horn switch, the present invention allows larger airbag modules to be installed within the steering wheel.

Furthermore, the horn switch of the present invention is constructed to protect the actuatable cable and, thus, the electrical circuit from contaminants such as dust, debris, water, and moisture. The present invention is also constructed to avoid having electrical current flow through the plungers 80 and to mitigate damage to the actuatable cable by providing the conductors 156 and 158 of the actuatable cable with protective layers 174 and 160, respectively. Due to these considerations, the present invention provides a horn switch that is reliable, repeatable, and functional in various environments.

From the above description of the invention, those skilled in the art will perceive improvements, changes and modifications. Such improvements, changes and modifications within the skill of the art are intended to be covered by the appended claims.

Having described the invention, the following is claimed:

1. A horn switch for a vehicle steering, the horn switch comprising:
    a frame for mounting to the steering wheel, the frame comprising a switch housing;
    a plunger associated with the switch housing, the plunger being movable relative to the switch housing between a non-actuating position and an actuating position; and
    an actuatable cable having a portion positioned in the switch housing, the actuatable cable comprising first and second conductors for electrical connection to a circuit that when closed actuates a vehicle horn, the actuatable cable having an expanded condition in which the first and second conductors are insulated from each other when the plunger is in the non-actuating position, the plunger when in the actuating position acting on the cable to place the cable in a compressed condition in which electrical continuity is established between the first and second conductors to close the circuit and actuate the vehicle horn.

2. The horn switch of claim 1, wherein the actuatable cable further comprises a deformable layer located between the first and second conductors, electrical current flowing from the first conductor to the second conductor through the deformable layer only when the cable is placed in the compressed condition by the plunger.

3. The horn switch of claim 2, wherein the first conductor comprises a plurality of conductive first wire filaments and the second conductor comprises a plurality of conductive second wire filaments.

4. The horn switch of claim 2, wherein the first conductor, the second conductor, and the deformable layer are coaxial.

5. The horn switch of claim 2, wherein the actuatable cable further comprises a protective outer layer.

6. The horn switch of claim 1 further comprising a spring for biasing the plunger towards the non-actuating position.

7. The horn switch of claim 1, wherein switch housing is a first switch housing and the plunger is a first plunger, the horn switch further comprising a second plunger and the frame further comprising a second switch housing associated with the second plunger.

8. The horn switch of claim 1, wherein the plunger is located on one of a hub, a spoke, and a rim of the steering wheel.

9. The horn switch of claim 1, wherein the switch housing includes a central passage, the plunger being positioned within the central passage for movement relative to the switch housing.

10. The horn switch of claim 9, wherein the switch housing includes a lateral passage for receiving the actuating cable, the lateral passage extending into the central passage.

11. The horn switch of claim 9, wherein the plunger includes a first portion having a first diameter and a second portion having a second diameter greater than the first diameter, the second portion being sized to prevent the plunger from exiting the central passage of the switch housing.

12. The horn switch of claim 1 further comprising a spring for biasing the plunger towards the non-actuating position, the switch housing including an annular recess for receiving an end of the spring.

13. The horn switch of claim 12 further comprising a cap secured to the plunger, the cap including a recess for receiving a second end of the spring.

14. A horn switch for a vehicle steering wheel, the horn switch comprising:
a frame for mounting to the steering wheel, the frame comprising a plurality of switch housings;
a plunger associated with each switch housing, each plunger being movable relative to its associated switch housing between a non-actuating position and an actuating position; and
an actuatable cable for providing an electrical signal to a vehicle horn, the actuatable cable having a portion within each switch housing, the actuatable cable comprising:
a first conductor;
a second conductor; and
a deformable layer positioned between the first conductor and the second conductor,
wherein the actuatable cable has (a) an expanded condition in which the deformable layer prevents electrical signals from passing between the first conductor and the second conductor when the plunger is in the non-actuating position and (b) a compressed condition in which electrical signals pass between the first conductor and the second conductor when the plunger is in the actuating position.

15. The horn switch of claim 14 wherein the plungers are independently movable between the non-actuating position and the actuating position.

16. The horn switch of claim 14, wherein each switch housing includes a central passage, the associated plunger being positioned within the central passage for movement relative to the switch housing.

17. The horn switch of claim 16, wherein each switch housing includes a lateral passage for receiving the actuating cable, the lateral passage extending into the central passage.

18. The horn switch of claim 16, wherein the associated plunger includes a first portion having a first diameter and a second portion having a second diameter greater than the first diameter, the second portion being sized to prevent the plunger from exiting the central passage of the switch housing.

19. The horn switch of claim 14 further comprising a spring associated with each switch housing for biasing the plunger towards the non-actuating position, the switch housing including an annular recess for receiving an end of the spring.

20. A vehicle steering wheel comprising:
a hub;
a rim;
at least one spoke interconnecting the hub and the rim; and
a horn switch comprising:
a frame mounted on the steering wheel, the frame comprising a switch housing;
a plunger associated with the switch housing, the plunger being movable relative to the switch housing between a non-actuating position and an actuating position; and
an actuatable cable having a portion positioned in the switch housing, the actuatable cable comprising first and second conductors for electrical connection to a circuit that when closed actuates a vehicle horn, the actuatable cable having an expanded condition in which the first and second conductors are insulated from each other when the plunger is in the non-actuating position, the plunger when in the actuating position acting on the cable to place the cable in a compressed condition in which electrical continuity is established between the first and second conductors to close the circuit and actuate the vehicle horn.

21. The horn switch of claim 20 further comprising a cap secured to each plunger, the cap including a recess for receiving a second end of the spring.

22. The steering wheel of claim 20, wherein the actuatable cable further comprises a deformable layer located between the first and second conductors, electrical current flowing from the first conductor to the second conductor through the deformable layer only when the cable is placed in the compressed condition by the plunger.

23. The steering wheel of claim 22, wherein the actuatable cable further comprises a protective outer layer.

24. The steering wheel of claim 20 further comprising a spring for biasing the plunger towards the non-actuating position.

25. The steering wheel of claim 20, wherein switch housing is a first switch housing and the plunger is a first plunger, the horn switch further comprising a second plunger and the frame further comprising a second switch housing associated with the second plunger.

26. The steering wheel of claim 20, wherein the switch housing includes a central passage, the plunger being positioned within the central passage for movement relative to the switch housing.

27. The steering wheel of claim 26, wherein the switch housing includes a lateral passage for receiving the actuating cable, the lateral passage extending into the central passage.

* * * * *